July 31, 1956 G. E. PIHL 2,757,245

COMPRESSOR AMPLIFIER

Filed March 16, 1954 2 Sheets-Sheet 1

Inventor
George E. Pihl
By Alois W. Graf
attorney

Inventor
George E. Pihl
By Alois W. Graf
attorney.

United States Patent Office 2,757,245

Patented July 31, 1956

2,757,245

COMPRESSOR AMPLIFIER

George E. Pihl, Abington, Mass., assignor, by mesne assignments, to Acton Laboratories, Inc., Boston, Mass.

Application March 16, 1954, Serial No. 416,611

5 Claims. (Cl. 179—171)

The present invention relates to a compressor amplifier, and more particularly to a compressor amplifier which translates a signal of varying amplitude into a signal of the same wave form but substantially constant amplitude.

In certain investigations and measurements it is often desirable to compare one signal with another signal, although the two signals might be of different wave form and different amplitude. In another instance it is desired to compare a particular signal which may have varying amplitude with a reference signal.

In such case it would be desirable to provide some means which would translate a signal of varying amplitude into a signal having substantially constant amplitude and a wave form substantially the same as the original signal.

In providing a compressor amplifier to hold nearly constant the amplitude of a signal supplied thereto, it is desired to avoid phase and frequency change or distortion. In order to achieve such an objective it was necessary to provide a system which employed a unique element comprising a voltage divider having a substantially constant RC product. This voltage divider made it possible to produce a compressor amplifier having a large input range and a wide frequency range. The voltage divider is of the dielectric type wherein the dielectric fluid has a certain loss characteristic.

It, therefore, is an object of the present invention to provide a compressor amplifier which will change a signal of varying amplitude into a signal of the same wave form but constant amplitude.

It is a further object of the present invention to provide an improved compressor amplifier having a frequency range from 100 cycles per second to one megacycle per second.

Another object of the invention is to provide an improved compressor amplifier having a minimum of phase shift.

Still another object of the invention is to provide an improved dielectric potentiometer having certain prescribed characteristics.

Other and further objects of the invention subsequently will become apparent by reference to the following description taken in conjunction with the accompanying drawings, wherein.

Figure 1:
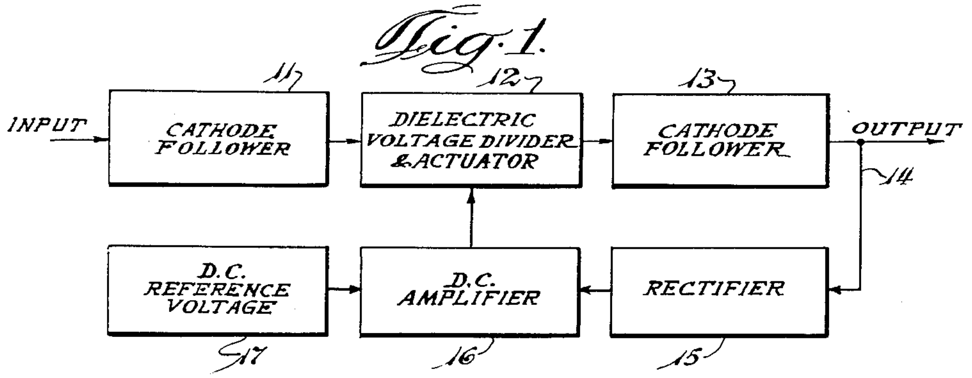
Figure 1 is a block diagram of a compressor amplifier embodying the present invention.

In Figure 1 there is shown in block diagram form a compressor amplifier embodying the principles of the present invention. The compressor amplifier employs a cathode follower 11 which is connected to a suitable input circuit. The output of the cathode follower is supplied to a dielectric voltage divider part of unit 12, which in turn is coupled to a cathode follower 13 connected to an output conductor 14. A portion of the energy from the output conductor 14 is supplied to a rectifier 15, which in turn is coupled to a direct current amplifier 16. A direct current reference voltage 17 is also supplied to the direct current amplifier 16 which has its output connected to the actuator part of unit 12. The arrangement shown in Figure 1 will accept an input signal of varying amplitude and provide an input signal of nearly constant amplitude having substantially the same wave form as the input signal.

Figure 2:
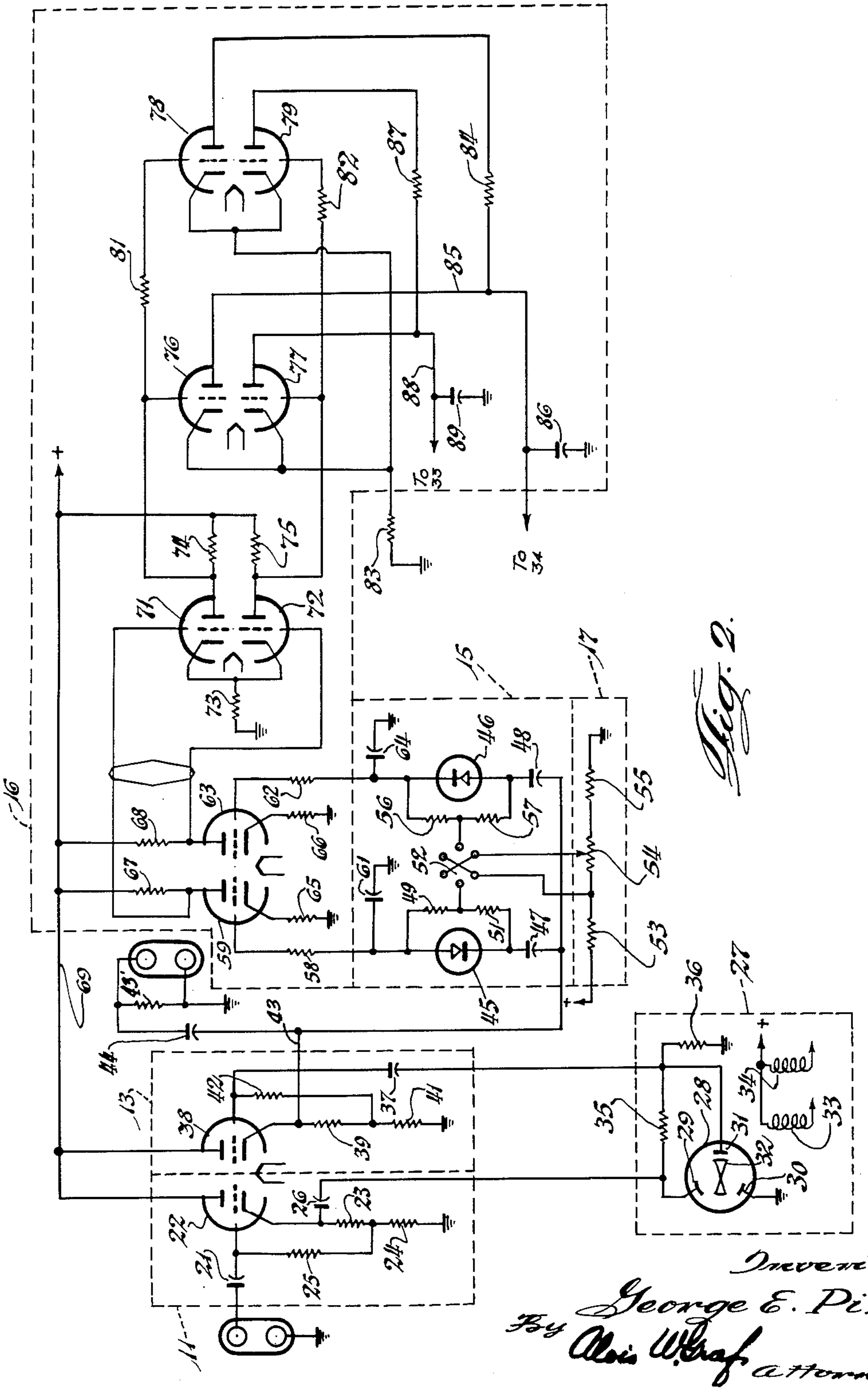
Figure 2 is a detailed circuit diagram of the system shown in Figure 1.

The system shown in Figure 1 in one particular embodiment employed the circuit diagram shown in Figure 2. The signal is applied to the input terminals, one of which is coupled by a capacitor 21 to the grid of a triode 22 connected in a cathode follower circuit. The cathode is connected to ground through two resistors 23 and 24, and the common juncture between these resistors is connected through a grid resistor 25 to the grid of the triode 22. A coupling capacitor 26 is connected from the cathode of the triode 22 to the input terminal of a dielectric potentiometer 27 which is connected in circuit with the cathode follower 13. The dielectric potentiometer as shown in Figure 2 has a casing 28 containing a dielectric fluid having a certain loss characteristic. To avoid the effects of certain stray capacitance, it is preferable to have the casing 28 constructed of metal and connected to ground. Within the casing 28 are located three fixed electrodes 29, 30 and 31. Also immersed in the dielectric fluid in the casing 28 is a movable electrode 32 constructed of a plurality of vanes, one of which is always associated with the output electrode 31, and the other of which is associated with either the input electrode 29 or the grounded electrode 30. The removable electrode 31 has its position controlled by a pair of electro-magnetic coils 33 and 34 which are actuated by the direct current amplifier 16. A resistor 35 is connected between the input and output terminals of the dielectric potentiometer, and another resistor 36 is connected between ground and the output terminal. These resistors are provided to compensate for some stray capacitance effects. The output terminal, which is connected to the electrode 31, is connected through a coupling capacitor 37 to the grid of a triode 38 forming a part of the cathode follower 13. The cathode of the cathode follower 13 is connected through two resistors 39 and 41 to ground. The grid is connected through a resistor 42 to the juncture between the resistors 39 and 41. The cathode is connected to a conductor 43 which is connected through a capacitor 44 to the output terminal. A suitable resistor 43' may be connected across the output terminals, one of which is connected to ground.

From the conductor 43, which is the output conductor of the cathode follower 14, a portion of the signal is supplied to the rectifier 15 which employs a pair of crystal diodes 45 and 46. The conductor 43 is coupled through a capacitor 47 to the diode 45 and through a similar capacitor 48 to the diode 46. A pair of resistors 49 and 51 are connected across the diode 45, and the common juncture is connected to one pole of a double pole double throw switch 52 which has its terminals connected to the source of direct current reference voltage 17. This is obtained from a circuit comprising a series of resistors 53, 54 and 55 connected between ground and the positive terminal of a source of direct current voltage. Two terminals of the switch 52 are connected to the juncture between the resistors 53 and 54. The other two terminals of the switch 52 are connected to an adjustable contact on the resistor 54. A pair of resistors 56 and 57 are connected across the crystal rectifier 46, and the common juncture between the resistors is connected to the other pole of the switch 52.

The rectifier 45 is connected through a resistor 58 to the grid of a triode 59 forming a portion of the direct current amplifier 16. The resistor 58 has one terminal connected to a grounded capacitor 61. The other rectifier 46 likewise is connected through a resistor 62 to a triode 63 also forming a part of the direct current amplifier 16. One end of the resistor 62 is connected to a capacitor 64 having its other end connected to ground. The triode 59 has its cathode connected through a resistor 65 to ground. The cathode of the triode 63 likewise is connected through a similar resistor 66 to ground. The anodes of the triodes 59 and 63 are connected through similar anode resistors 67 and 68 to the anode potential conductor 69 which is also connected to the anodes of the triodes 22 and 38. The anodes of the triodes 59 and 63 are coupled to the grids of a pair of triodes 71 and 72 having their cathodes connected to ground through a resistor 73. The anodes of the triodes 71 and 72 are connected through similar resistors 74 and 75 to the anode potential conductor 69. The output of the pair of triodes 71 and 72 is connected to two sets of triodes 76, 77 and 78, 79, which comprise current amplifiers. The grids of the triodes 76 and 77 are directly connected to the anodes of the triodes 71 and 72, but the grids of the triodes 78 and 79 are connected through resistors 81 and 82 to the anodes of the triodes 71 and 72. The cathodes of the triodes 76, 77, 78 and 79 are all connected through a resistor 83 to ground. The anode of the triode 78 is connected through a resistor 84 to a conductor 85 which is directly connected to the anode of the triode 76 and to one terminal of the actuating coil 34 of the dielectric potentiometer. The conductor 85 is connected to a suitable by-pass capacitor 86 having one terminal connected to ground. The anode of the triode 79 is connected through a resistor 87 to a conductor 88 which is directly connected to the anode of the triode 77 and to the actuating coil 33. The conductor 88 is connected to one terminal of a by-pass capacitor 89 having its other terminal connected to ground.

Figures 3, 4, 5, 6:
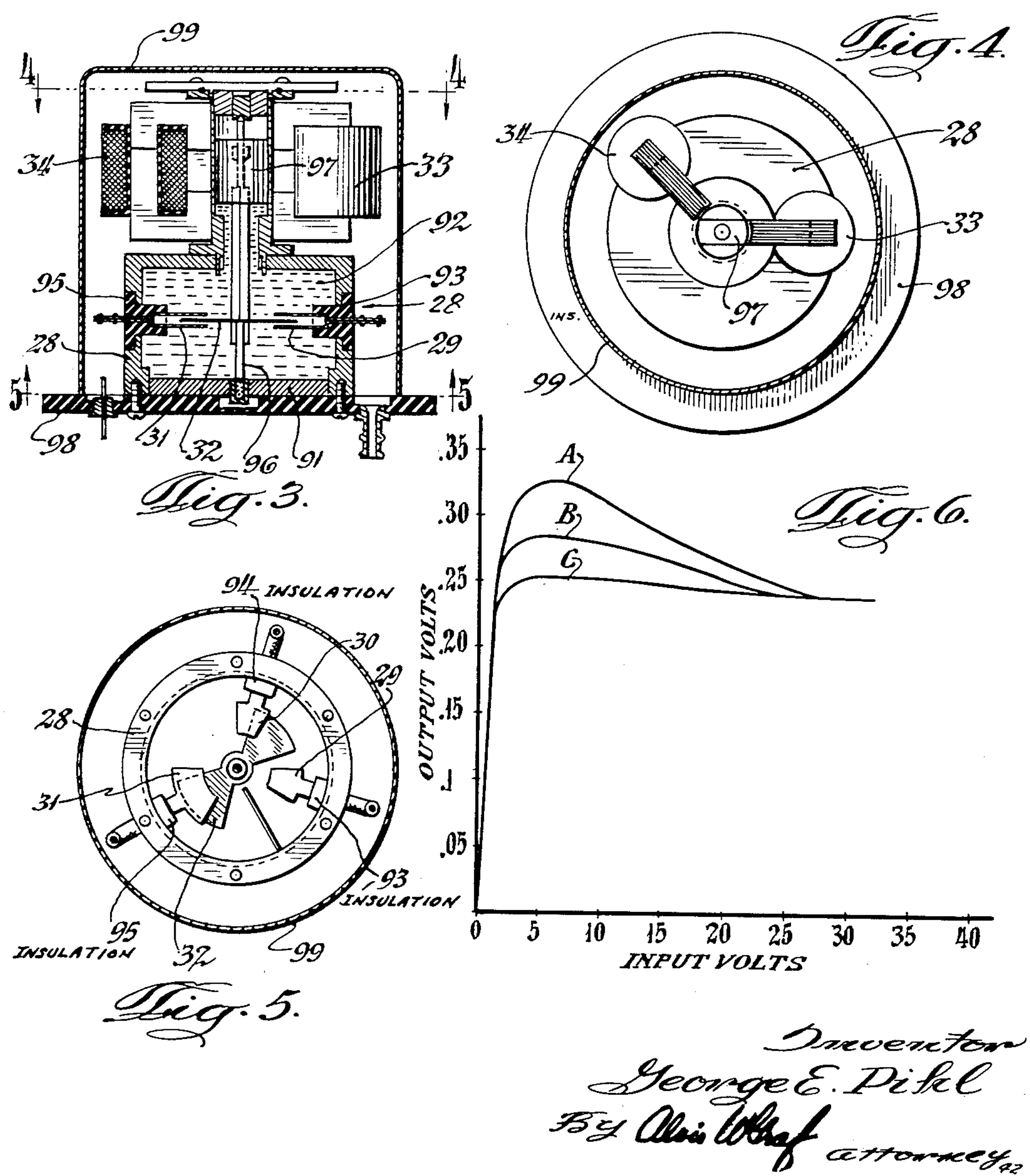
Figure 3 is a vertical cross-sectional view of the dielectric potentiometer employed in the system shown in Figures 1 and 2.
Figure 4 is a horizontal cross-sectional view of the dielectric potentiometer as seen in the direction of the arrows along the line 4—4 of Figure 3.
Figure 5 is a horizontal cross-sectional view of the dielectric potentiometer as seen in the direction of the arrows along the line 5—5 of Figure 3.
Figure 6 is a graphical representation showing the compression characteristics of the system of Figures 1 and 2.

An essential and unique part of the system shown in Figures 1 and 2 is the dielectric voltage divider which is shown in greater detail in Figures 3, 4 and 5. From Figure 3 it will be noted that the dielectric potentiometer casing 28 comprises an inverted cup or cylinder having a closure member 91. The closed casing 28 is filled with a suitable dielectric fluid 92. The liquid 92 is a lossy dielectric medium which establishes an effective resistance in parallel with the capacitance. Within a certain temperature range the parallel combination of resistance and capacitance provides a constant RC product at the output terminals. This fluid is one which has a desirable loss characteristic which remains substantially constant over the range of temperatures for which the device is designed to operate. Some of the more satisfactory dielectric fluids are acetone and the various alcohols. From Figures 3 and 5 it will be seen that the fixed electrode 29 is supported by a suitable insulating bushing 93, and that the other fixed electrode 30 likewise is supported by a suitable insulating bushing 94. It will be noted that the two electrodes 29 and 30 are of similar configuration comprising substantially sectors of an annular ring when seen from the top as in Figure 5. These two electrodes are spaced apart and are equidistant from another fixed electrode 31 which is a larger segment and which is also supported by an insulating bushing 95. The movable electrode 32 is supported on a pivot or spindle 96 which is connected to a magnetic rotor 97 located above the casing 28. The magnetic rotor 97 is associated with the actuating coils 33 and 34 which are energized from the circuit shown in Figure 2. The spindle 96 is suitably journaled as shown in the drawing in a manner which is readily apparent to those skilled in the art. The dielectric potentiometer is preferably supported on an insulating base 98 and may be enclosed by a suitable protective covering 99.

The dielectric voltage divider shown in Figures 3, 4 and 5 comprises a mechanically operated voltage divider which is continually controlled in the high gain closed-loop system. The coils 33 and 34 receive current in accordance with the error determined by the rectified output voltage of the rectifiers 45 and 46 as determined by the fixed direct current reference voltage obtained from the switch 52. As is apparent from Figures 1 and 2, a certain portion of the output voltage is supplied to the rectifiers which by comparison with the reference voltage produce a voltage which is amplified by the direct current amplifier 16 to provide the desired current in the conductors 85 and 88. The change in current in these conductors changes the magnetic field associated with the coils 33 and 34, which affects the rotor carrying a suitable magnetic structure so as to tend to orient itself with respect to the magnetic fields produced by the two coils 33 and 34 in their cooperating ferromagnetic cores. Preferably the rotator 97 is constructed so as to have its own magnetic field by a small permanent magnet incorporated therein. Thus the permanent magnet would tend to react with the field set up by either of the coils 33 and 34 to shift the vane 32 which is always associated with the output electrode 31, and being associated with either of the electrodes 29 or 30 dependent upon its particular position. The change in position of the movable electrode 32, therefore, produces a substantially constant output from the cathode follower 13, but the shape of the signal is similar although of constant amplitude relative to the shape and amplitude of the input signal. There is negligible phase shift because the dielectric potentiometer has a substantially constant RC product. In one particular embodiment the compressor was operative over a range of 500 cycles per second to 1 megacycle per second. This relation is illustrated by the graph of Figure 6 wherein the curve C illustrates the operation from 500 cycles per second to 1 megacycle per second, curve B illustrates the operation in the range of 200 cycles per second, and curve A the operation at 100 cycles per second. The input signals varied from 1¼ volts to 50 volts.

While for the purpose of illustrating and describing the present invention certain embodiments have been indicated in the drawings, it is to be understood that these do not constitute limitations since the invention is deemed susceptible of other embodiments limited only by the scope of the claims appended hereto.

I claim as my invention:

1. An amplifier for translating a variable signal into a substantially constant amplitude signal of similar wave shape comprising a dielectric voltage divider connected to receive said signal, said voltage divider having a dielectric liquid having a substantial loss characteristic which is substantially constant over the normal operating temperature range of the device, a movable electrode positioned wtihin said divider to regulate the output of said divider, said divider having output terminals across which there appears a parallel combination of resistance and capacitance which for all regulation conditions of said device is expressed as a constant RC product, means for rectifying a portion of said output and comparing it with a reference potential, and means for positioning the electrode in accordance with said comparison.

2. Apparatus as claimed in claim 1 wherein said dielectric voltage divider includes a casing containing two spaced fixed electrodes respectively connected to the input and output thereof, a third fixed electrode connected to both the input and output, and a movable electrode positioned between said three fixed electrodes.

3. An amplifier for translating a variable signal into a substantially constant amplitude signal of similar wave shape comprising a vacuum tube isolation stage, a dielectric voltage divider connected to receive a signal from said isolation stage, said voltage divider having a dielectric liquid having a substantial loss characteristic which is substantially constant over the normal operating temperature range of the device, a movable electrode positioned within said divider to regulate the output of said divider, said divider having output terminals across which there appears a parallel combination of resistance and capacitance which for all regulation conditions of said device is expressed as a constant RC product, a vacuum tube isolation stage connected to the output of said divider, a source of direct current reference potential, means for rectifying a portion of the signal of said output isolation stage and comparing it with said reference potential, and electromagnetic means for positioning the electrode in accordance with said comparison.

4. Apparatus as claimed in claim 3 wherein said dielectric voltage divider includes a casing containing two spaced fixed electrodes respectively connected to the input and output thereof, a third fixed electrode connected to both the input and output, and said movable electrode is positioned between said three fixed electrodes.

5. An amplifier for translating a variable signal into a substantially constant amplitude signal of similar wave shape comprising a cathode follower connected to receive said signal, a dielectric voltage divider connected to receive said signal from said cathode follower, said voltage divider having a dielectric liquid having a substantial loss characteristic which is substantially constant over the normal operating temperature range of the device, a movable electrode positioned within said divider to regulate the output of said divider, said divider having input and output terminals associated with said movable electrode, across said output terminals there appears a parallel combination of resistance and capacitance expressed as a constant RC product for all positions of the movable electrode, a cathode follower connected to the output of said divider, a source of direct current reference potential, rectifying means for a portion of the signal of said output cathode follower, means for comparing said rectified signal with said reference potential, and electromagnetic means for positioning the movable electrode in accordance with said comparison.

References Cited in the file of this patent

UNITED STATES PATENTS

| | | |
|---|---|---|
| 2,075,956 | Payne | Apr. 6, 1937 |
| 2,106,336 | Anderson | Jan. 25, 1938 |
| 2,589,134 | Pyle | Mar. 11, 1952 |
| 2,647,174 | Maron | July 28, 1953 |
| 2,659,039 | Bourgonnier et al. | Nov. 10, 1953 |
| 2,666,815 | Chapin | Jan. 19, 1054 |

FOREIGN PATENTS

| | | |
|---|---|---|
| 849,954 | France | Aug. 28, 1939 |